M. T. BAIRD.
GOVERNOR FOR AUTOMOBILE ENGINES AND THE LIKE.
APPLICATION FILED JUNE 25, 1913.
1,143,347.
Patented June 15, 1915.
9 SHEETS—SHEET 1.
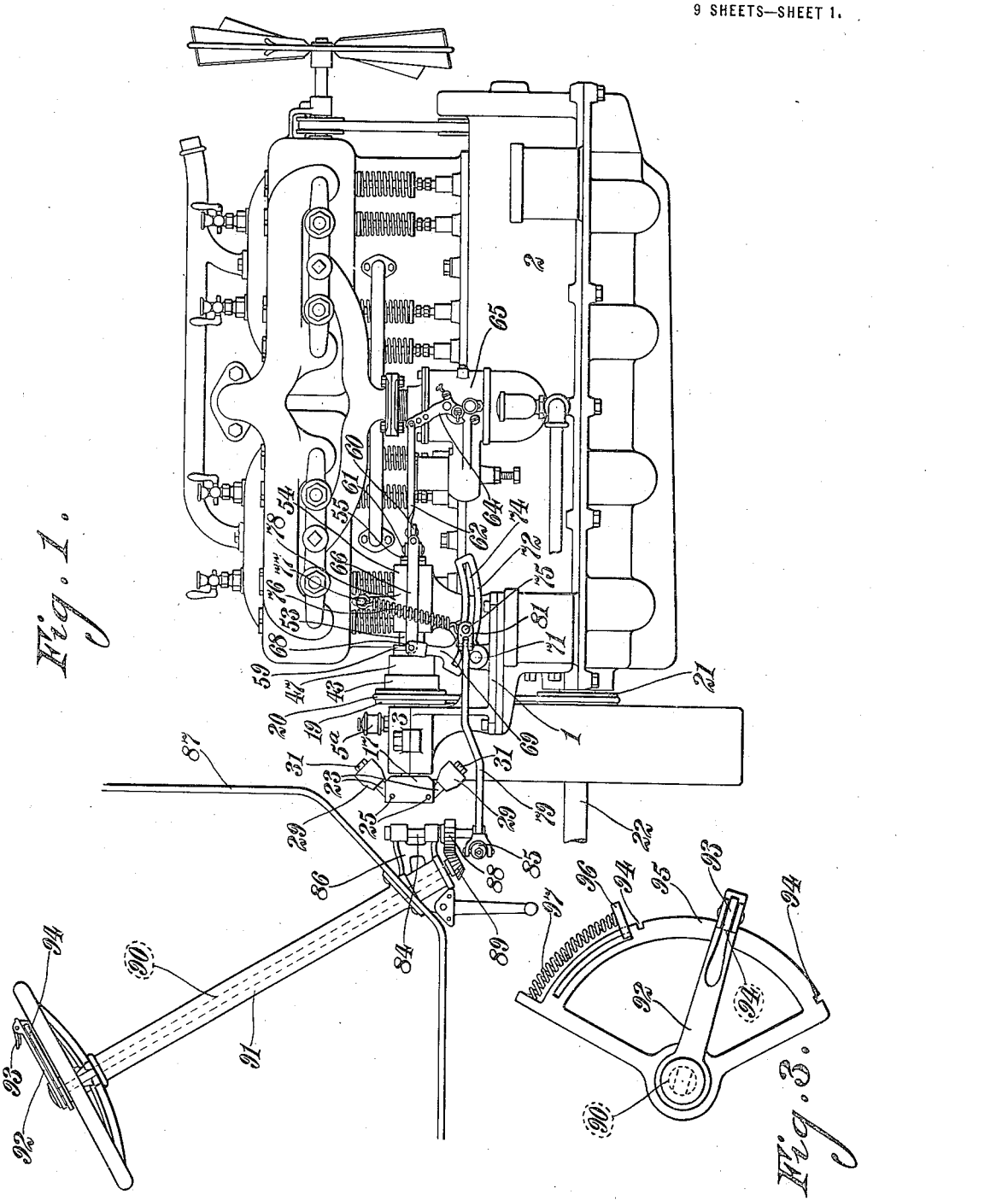
Witnesses:
George G. Anderson.
Harry H. Reiss.
Inventor:
Myron T. Baird,
By Hugh K. Wagner,
His Attorney.

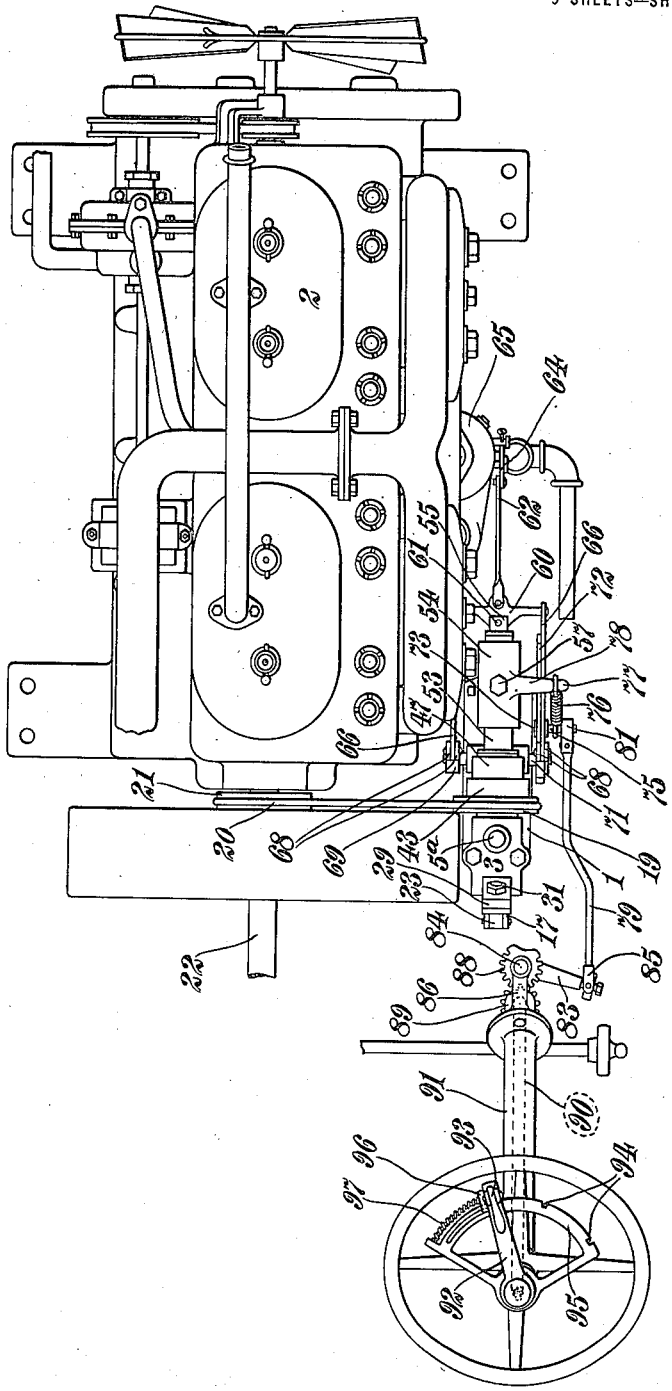

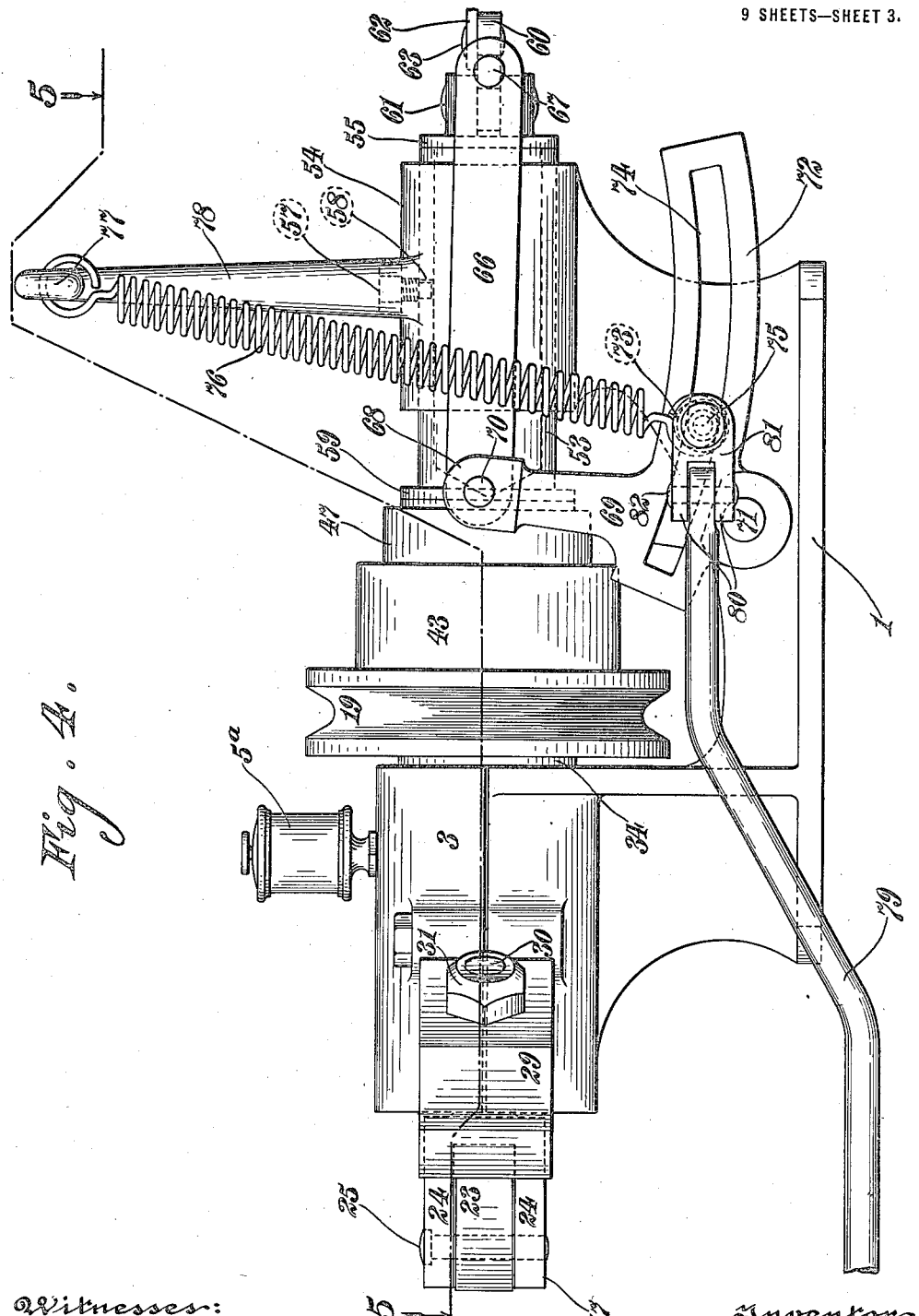

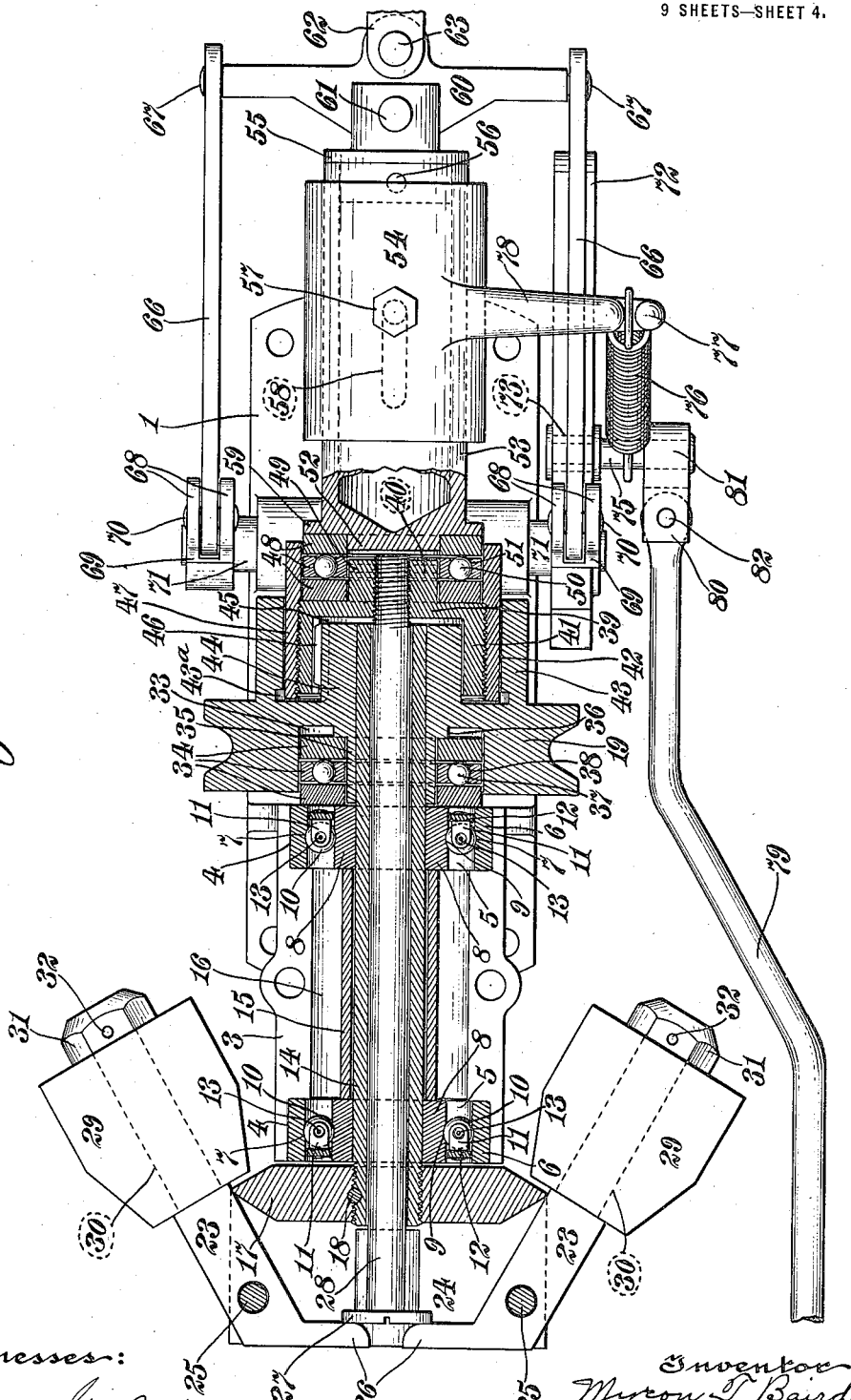

M. T. BAIRD.
GOVERNOR FOR AUTOMOBILE ENGINES AND THE LIKE.
APPLICATION FILED JUNE 25, 1913.

1,143,347.

Patented June 15, 1915.
9 SHEETS—SHEET 5.

Witnesses:
George G. Anderson
Harry H. Reiss

Inventor:
Myron T. Baird,
By Hugh K. Wagner
His Attorney.

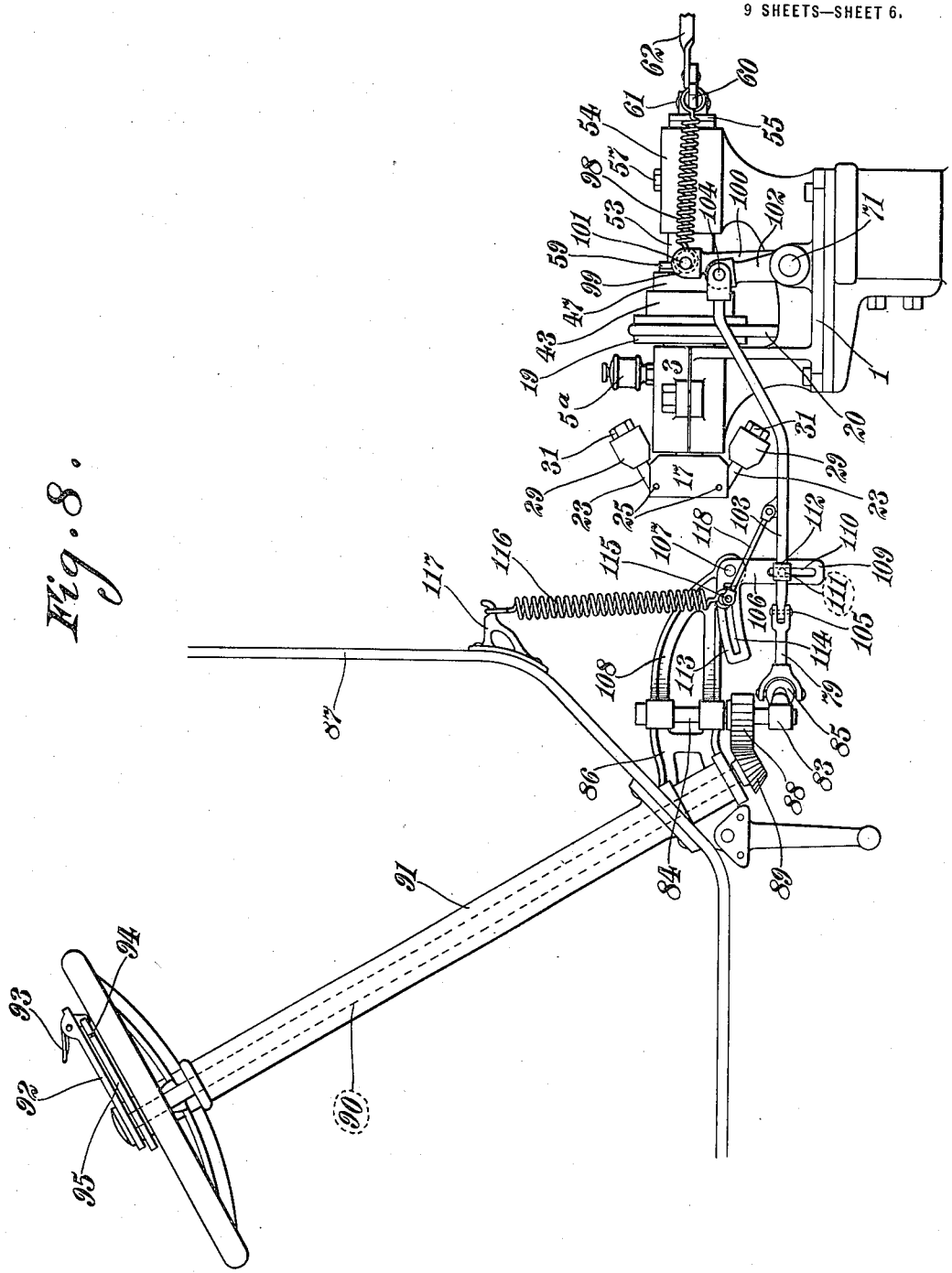

M. T. BAIRD.
GOVERNOR FOR AUTOMOBILE ENGINES AND THE LIKE.
APPLICATION FILED JUNE 25, 1913.
1,143,347. Patented June 15, 1915.
9 SHEETS—SHEET 7.
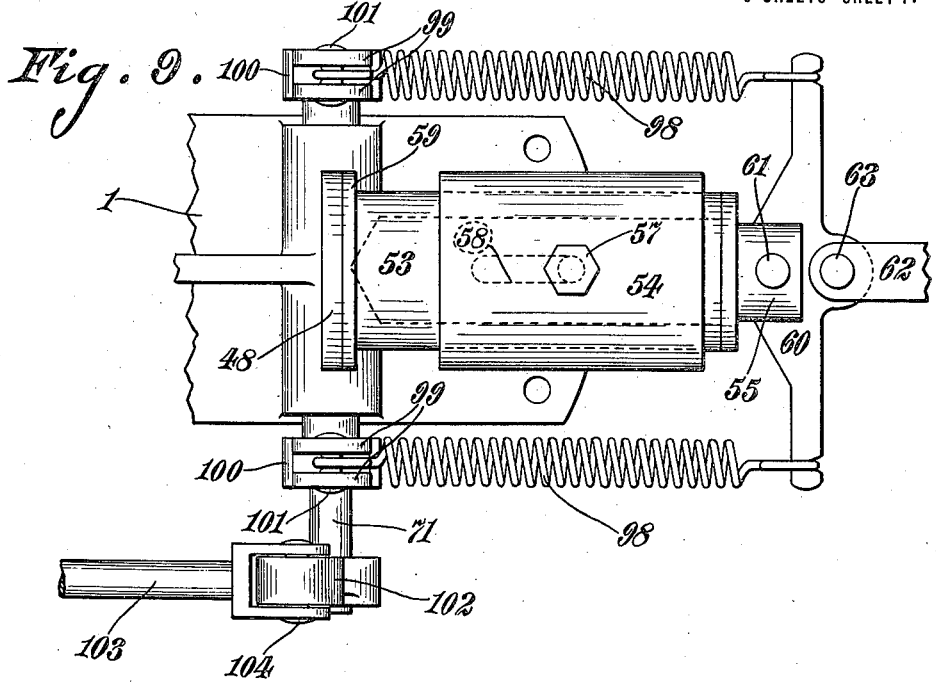
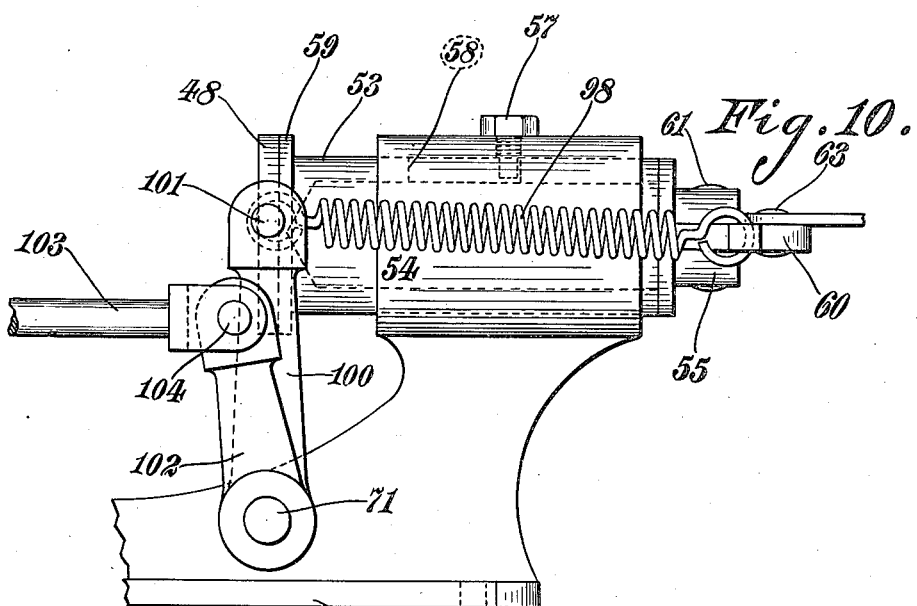

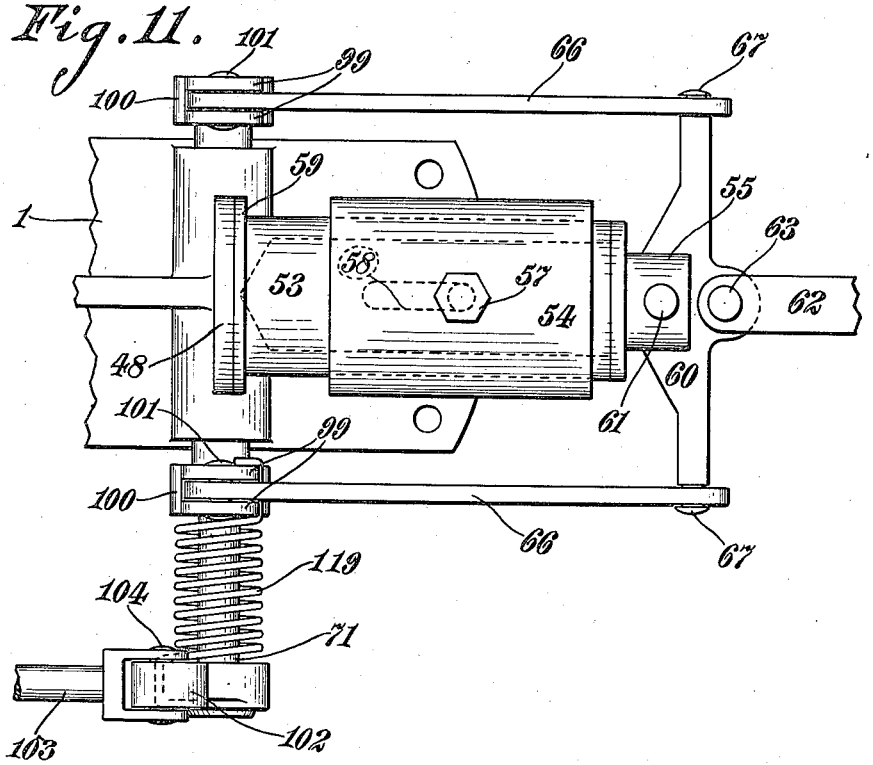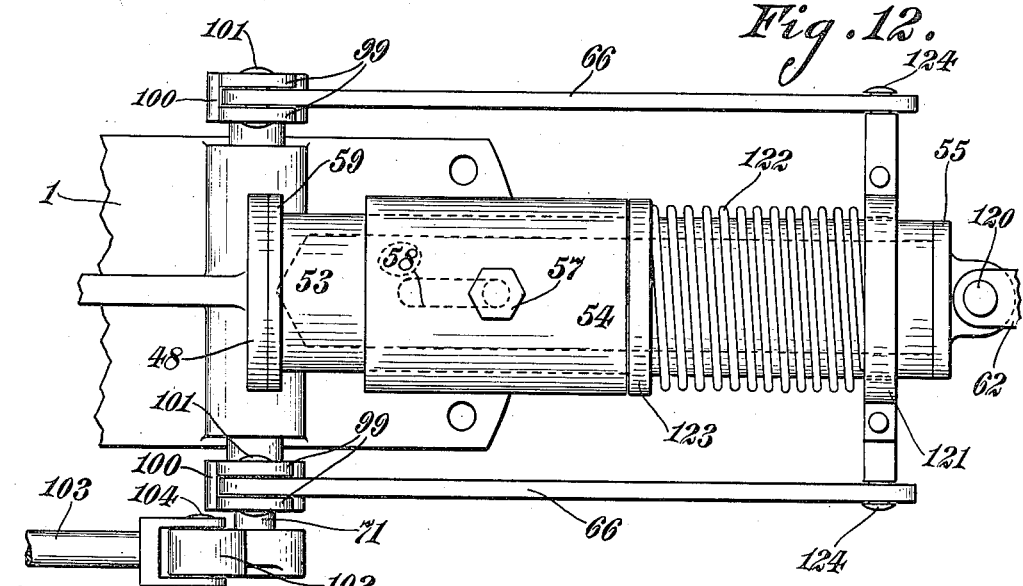

M. T. BAIRD.
GOVERNOR FOR AUTOMOBILE ENGINES AND THE LIKE.
APPLICATION FILED JUNE 25, 1913.
1,143,347.
Patented June 15, 1915.
9 SHEETS—SHEET 9.
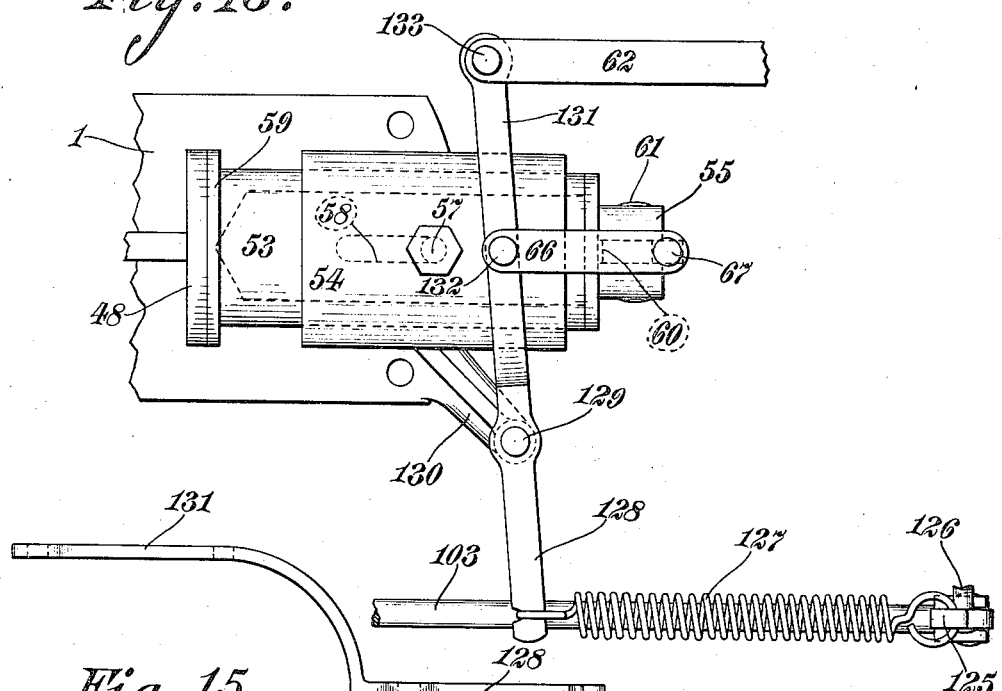
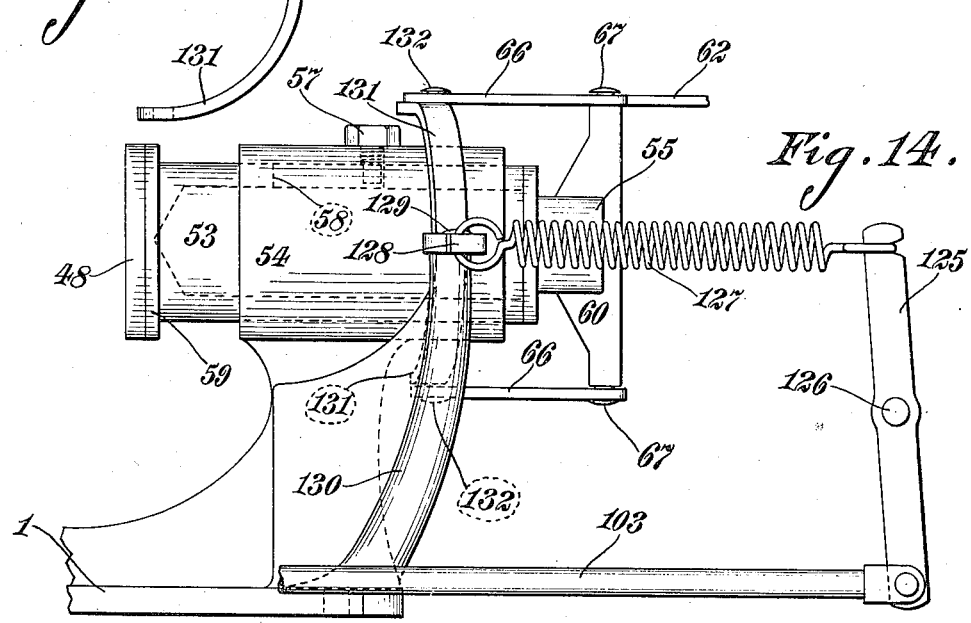

UNITED STATES PATENT OFFICE.

MYRON T. BAIRD, OF ST. LOUIS, MISSOURI.

GOVERNOR FOR AUTOMOBILE-ENGINES AND THE LIKE.

1,143,347. Specification of Letters Patent. Patented June 15, 1915.

Application filed June 25, 1913. Serial No. 775,672.

*To all whom it may concern:*

Be it known that I, MYRON T. BAIRD, a citizen of the United States, residing at the city of St. Louis, State of Missouri, have invented certain new and useful Improvements in Governors for Automobile-Engines and the like, of which the following is a specification.

This invention relates to governors for automobile engines and the like, and has for its object to provide a governor, which is adapted to control the throttle-valve of the engine in such manner as to prevent the latter from running faster than a predetermined speed.

Another object of the present invention resides in the provision of means for adjustably setting the governor for various speeds of the engine.

A further object of the present invention resides in the provision of means for controlling the governor from the driver's seat.

A still further object of the present invention consists in the provision of means to insure the positive operation of the throttle-valve in case of the failure of the governor to effect its operation.

Further, the present invention consists of the novel features of construction and arrangement of parts hereinafter more fully described and pointed out in the claims.

Figure 6:
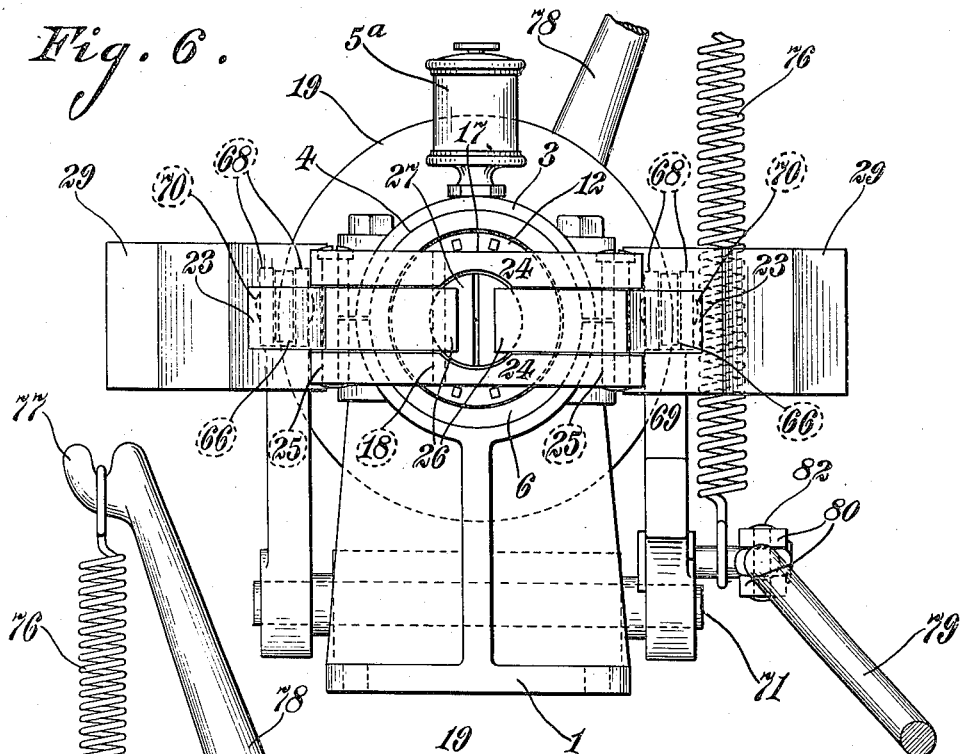
Figure 7:
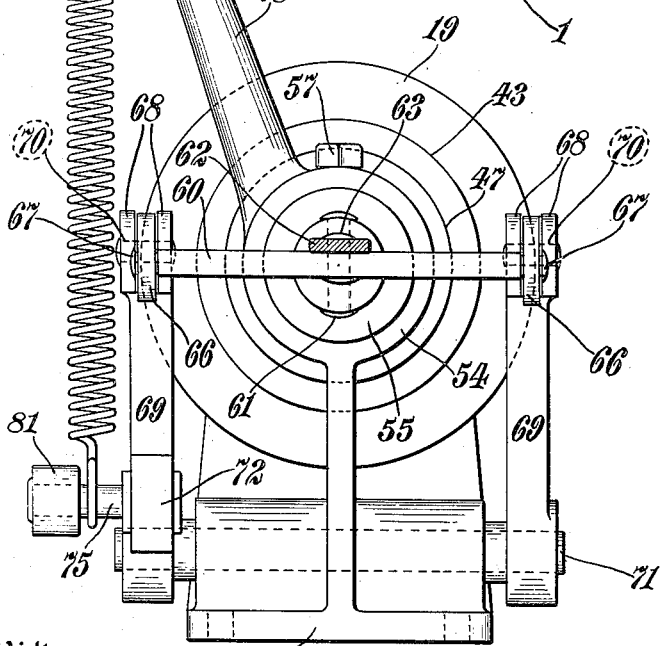

In the accompanying drawings forming part of this specification, in which like numbers of references denote like parts wherever they occur, Figure 1 is a side elevation of an automobile engine with a governor embodying the present invention in connection therewith; Fig. 2 is a top plan view of same; Fig. 3 is a top plan view of the lever for adjustably setting the governor from the driver's seat; Fig. 4 is a side elevation, on an enlarged scale, of the governor; Fig. 5 is a sectional view on the line 5—5, Fig. 4; Figs. 6 and 7 are rear and front elevations, respectively, of the governor; Fig. 8 is a side elevation of the governor, showing an alternate form of the spring arrangement and setting means therefor; Figs. 9 and 10 are top and side views, respectively, of the front portion of same; Figs. 11, 12, and 13 are top plan views of the front portion of the governor, showing alternate forms of arrangement of the springs; Fig. 14 is a side elevation of the form of the invention depicted in Fig. 13; and Fig. 15 is a detailed view of the lever used in the form of the invention depicted in Figs. 13 and 14.

The base 1 of the governor may be bolted or otherwise secured to the casing of the engine 2, as depicted in Figs. 1 and 2, or it may be secured to the chassis or any other part (not shown in the drawings) of the automobile. A pillow-block 3 borne by the base 1 has annular recesses 4 in its ends for the reception and retention of a pair of ball-bearings 5, and may have an oil-cup $5^a$ or a plurality of such oil-cups fastened thereto for the reception of a lubricant for said ball-bearings. Each ball-bearing 5 consists of an outer ring 6 having a raceway 7 in its inner face, an inner ring 8 having a raceway 9 in its outer face, and balls 10 traveling in said raceway. Lugs 11 borne by a ring 12 are spaced apart to separate the balls 10 and have depressions or recesses 13 in their opposite faces to receive said balls. A hollow shaft 14 extends through the inner rings 8 and has a sleeve 15 revolubly fitted thereon within the bore 16 of the pillow-block 3, in order to hold the inner rings 8 of the ball-bearings 5 in spaced relation, said bore being preferably relatively larger than said sleeve. One end of the shaft 14 is preferably screw-threaded to fit in a screw-threaded opening in a member 17, which is located adjacent to the rear end of the pillow-block 3 and is held firmly on said shaft by a pin 18 or other suitable means, so as to rotate therewith, and the other end of said shaft has a pulley 19 rigidly mounted thereon, said pulley being preferably grooved and being driven by a belt 20, which receives its power from a pulley 21 on the drive shaft 22 of the engine 2. A pair of levers 23 is pivotally attached to and between the walls 24 of the member 17 by pins 25 or the like. Each lever 23 is provided with an arm 26, which extends between the walls 24 of the member 17 and engages the head 27 on the rear end of a rod 28, the latter extending longitudinally through the hollow shaft 14. A centrifugal weight 29 borne by the outer end of said lever 23 may fit on a reduced portion 30 of the latter and be held thereon by a nut 31, which is locked in place by a pin 32 or other suitable means, or said weight may be secured to said lever by any other suitable means, or, if desired, said weight may be formed integrally with said lever. Pressure that is applied to the forward end of the rod 28 in the manner hereinafter described tends to force the rod rearwardly and thereby causes the head 27 of same to press rearwardly against the arms 26 of the levers 23, whereby the levers 23 moves the centrifugal weights inwardly toward each other, such movement of said levers being limited by the engagement of same with the ends of the member 17, as best seen in Fig. 5.

The pulley 19 is located adjacent to the forward end of the pillow-block 3 and is preferably provided with an annular recess 33 in the rear side thereof for the reception of the rings or washers 34 of a ball thrust-bearing. This ball thrust-bearing preferably consists of three rings or washers 34, which are revolubly mounted on a reduced portion 35 of the hub of the pulley 19, one ring or washer 34 bearing against the forward ends of the rings 6 and 8 of the ball-bearing 5 in the forward end of the pillow-block 3, another ring or washer 34 bearing against a shoulder 36 on the reduced portion 35 of the hub of the pulley 19, and the third or middle ring or washer 34 having a plurality of balls 37 revolubly supported in openings 38 therein. The balls 37 are larger in diameter than the thickness of the middle ring or washer 34 and bear against the other two rings or washers 34.

The forward end of the rod 28 is preferably screw-threaded and fits in a screw-threaded opening in a member 39, being held securely in said opening by a pin 40 or other suitable means. A rearwardly-projecting annular extension 41 borne by the member 39 extends into an annular space or recess 42 between a forwardly-projecting annular extension 43 of the pulley 19 and a forwardly-projecting extension 44 of the hub of said pulley, being provided with a longitudinal groove 45 to receive a spline 46 borne by the extension 44, so that said member 39 will rotate with said pulley and, also, be capable of reciprocating longitudinally on the extension 44. The extension 41 on the member 39 is preferably screw-threaded externally and has an internally screw-threaded sleeve 47 fitting thereon, the forward end of said sleeve extending beyond the forward end of the member 39 and encircling the rings or washers 48 of another ball-thrust-bearing. One of the rings or washers 48 is revolubly mounted on a reduced portion 49 of the member 39 and has a plurality of balls 50 revolubly supported in openings 51 therein, which balls bear against the faces of the other two rings or washers 48, one of the latter being, also, revolubly mounted on said reduced portion 49 and the other being revolubly mounted on the reduced rear end 52 of a shaft 53, which is reciprocatively mounted in a bearing 54 borne by the base 1 and is located in substantially axial alinement with the shaft 14. The shaft 53 is preferably hollow, its rear end being closed and its forward end having a plug 55 secured therein by a pin 56 or other suitable means. A bolt or screw 57 or the like, which fits in a screw-threaded opening in the bearing 54, projects into a longitudinal slot 58 in the shaft 53 and prevents rotary movement of the latter. A shoulder 59 on the rear end of the shaft 53 is adapted to engage the rear end of the bearing 54 and thereby limits the forward movement of said shaft.

In order to prevent the reciprocatory movement of the member 39 from being interfered with by the compression of air within its extension 41 or within the extension 43, sufficient space is left between the spline 46 and the walls of the groove 45 to allow the interior of the extension 41 to communicate with a recess 43$^a$ within the extension 43, and sufficient space is left between the periphery of the sleeve 47 and the inner wall of the extension 43 to afford communication between the recess 43$^a$ and the atmosphere.

A lever 60 extends through a transverse slot in the outer end of the plug 55 and is secured at substantially the middle to said plug by a pin 61 or other suitable means. A link 62, which may be pivotally attached at 63 to the middle of the lever 60, is connected to the operating lever 64 of the throttle-valve within the carbureter 65 for the purpose hereinafter described. The forward ends of a pair of links 66 are pivotally connected to the ends 67, respectively, of the lever 60, and the rear ends of said links are pivoted to and between the prongs 68 of the bifurcated ends of two levers 69 by pins 70 or the like, said levers 69 being rigidly mounted on a shaft 71, which is journaled in a transverse opening in the base 1, and being located on opposite sides of said base. One of the levers 69 is preferably in the form of a bell-crank having a slotted arm 72. An anti-friction roller 73 fits in the slot 74 in the arm 72, and is revolubly mounted on a pin or bolt 75 to which an end of a spring 76 is attached, the other end of said spring being attached to the end 77 of an arm or projection 78, which may be borne by the bearing 54. The slot 74 is preferably arcuated and is arranged so that its forward end or greater part extends forwardly from the line through the axis of the shaft 71 and the end 77 of the arm 78, and its rear end or lesser part extends rearwardly from said line. By this arrangement, when the pin 75 stands in a position in front of the line through the axis of the shaft 71 and the end 77 of the arm 78, the spring 76 will rock the shaft 71 counter-clockwise, Figs. 1 and 4, and thereby cause the levers 69 to pull the links 66 rearwardly, which links, in turn, force the shaft 53 rearwardly, with the result of causing the link 62 to move the operating lever 64 of the throttle-valve to the position to open to the fullest extent the communication between the carbureter and the engine cylinder or cylinders, but, when the pin 75 is moved to a position behind said line, the spring 76 will rock the shaft 71 clockwise and thereby cause the levers 69 to move the shaft 53 forwardly through the medium of the links 66 and lever 60, with the result of causing the link 62 to move the operating lever 64 of the throttle-valve to the position nearly to close the communication between the carbureter and the engine cylinder or cylinders.

It should be understood that, when the shaft 53 moves from its extreme rearward position to its extreme forward position, it moves the operating lever 64 of the throttle-valve from the position, in which the throttle-valve establishes the greatest communication between the carbureter and the engine cylinder or cylinders for the highest speed of the engine, to the position, in which the throttle-valve establishes the least communication between the carbureter and the engine cylinder or cylinders for the lowest speed of the engine.

It will be evident that, when the pin 75 is moved forwardly in the slot 74 away from the shaft 71, the pull of the spring 76 will cause the pull of the levers 69 upon the links 66 to increase, thereby causing the pressure of the rear end of the shaft 53 against the forward end of the rod 28, through the medium of the member 39 and the ball thrust-bearing composed of the rings or washers 48 and the balls 50, to increase, with the result that the head 27 of said rod increases its pressure against the arms 26 of the levers 23. After the pin 75 has been set in a predetermined position in front of the line through the axis of the shaft 71 and the end 77 of the arm 78 in the manner hereinafter described, the pull of the spring 76 holds the shaft 53, rod 28, and levers 23 normally in the positions depicted in Fig. 5, whereby the link 62 holds the operating lever 64 of the throttle-valve in position to open to the fullest extent the communication between the latter and the engine cylinder or cylinders. After the engine 2 has been set in operation, the shaft 22 drives the shaft 14 through the intermediation of the pulleys 21 and 19 and belt 20 and thereby rotates the member 24, and whenever the speed of the engine shaft 22 becomes sufficient to cause the centrifugal weights 29 to move outwardly sufficiently to cause the arms 26 of the levers 23 to overcome the rearward pressure of the head 27 of the rod 28 against said arms 26, the latter will force the rod 28 forwardly and thereby cause the shaft 53 to move forwardly, with the result of causing the link 62 to move the operating lever 64 of the throttle-valve to a position to diminish the communication between the carbureter and the engine cylinder or cylinders. This diminishing of the communication between the carbureter and the engine cylinder or cylinders result in decreasing the speed of the engine, as will be obvious. In this way, the governor controls the communication between the carbureter and the engine cylinder or cylinders so as to prevent the engine from running faster than a predetermined speed.

In order to set and hold the pin 75 in any desired position in the slot 74 of the bell-crank lever 69, the former may be operated from the driver's seat of the automobile by mechanism now to be described. The forward end of a link 79 is preferably pivoted to and between the prongs 80 of the bifurcated end of a member 81 by a pin 82 or other suitable means, which member is secured to the pin 75, and the rear end of said link is connected to the end of an arm 83 on shaft 84 by means of a universal joint 85, said shaft being journaled in a bracket-bearing 86, which may be supported by the dash-board 87 or other part of the automobile. A segmental gear 88 on the shaft 84 meshes with a pinion 89 on the lower end of shaft 90, the latter extending upwardly through the steering post 91 and having a lever 92 secured to its upper end for the purpose of rotating same. Movement of the lever 92 in either direction effects movement of the pin 75 in the slot 74 through the intermediary of shaft 90, pinion 89, gear 88, arm 83, and link 79, clockwise movement, Fig. 1, of said lever causing the pin 75 to move forwardly in the slot 74, and reverse movement of said lever causing the pin 75 to move rearwardly in said slot. As a means for holding the lever 92 in a set position, same has a spring-controlled latch 93 pivotally or otherwise attached thereto, which latch is adapted to seat in a notch 94 in the peripheral edge of a sector 95 supported by the steering post 91, there being a plurality of such notches in said sector. The notches 94 are predeterminedly and accurately spaced apart so that, when the lever 92 occupies a position in which the latch 93 seats in the first notch 94, as depicted in Fig. 2, the pin 75 will stand near the shaft 71, in front of the line through the axis of said shaft and the end 77 of the arm 78, whereby the pull of the spring 76 will allow the centrifugal weights 29 to force the rod 28 forwardly and thereby move the shaft 53 forwardly, as hereinabove described, with the result that the link 62 moves the operating lever 64 of the throttle-valve to the position in which the minimum communication is established between the carbureter and the engine cylinder or cylinders, so that the engine will drive the car at a predetermined low speed. As long as the pin 75 remains in this position, the engine is prevented from driving the car faster than the predetermined low speed.

When the lever 92 is moved to the position in which the latch 93 seats in the second notch 94, the pin 75 will be moved farther forwardly in the slot 74, whereby the pull of the spring 76 will allow the centrifugal weights 29 to force the rod 28, shaft 53, and link 62 forwardly to such extent that the forward pressure of the arms 26 of the levers 23 becomes equal to the rearward pressure of the shaft 53, with the result that the link 62 moves the operating lever 64 of the throttle-valve to the position to establish a greater communication between the carbureter and the engine cylinder or cylinders than for the low speed of the car, thus permitting the engine to drive the car at a higher speed than the low speed and, also, preventing the engine from driving the car faster than the predetermined higher speed as long as the latch 93 seats in the second notch 94. Moving the lever 92 to the position in which the latch 93 seats in the third notch 94 moves the pin 75 still farther forwardly in the slot 74 to its extreme forward position, whereby the pull of the spring 76 holds the shaft 53 in its extreme rearward position and thereby causes the link 62 to hold the operating lever 64 of the throttle-valve in the position to establish and maintain the maximum communication between the carbureter and the engine cylinder or cylinders as long as the latch 93 seats in the third notch 94, thus permitting the engine to drive the car at the highest speed. It should be understood that any number of notches 94 may be formed in the peripheral edge of the sector 95, or any other suitable means may be employed to hold the lever 92 in predetermined positions for various speeds of the car.

A stop 96, which may be slidably mounted on the sector 95, is held by a spring 97 normally in the position to engage the lever 92, when the latter is in the low speed position, i. e., in the position in which the latch 93 seats in the first notch 94. This stop 96 facilitates the centering of the lever 92 in its low speed position so that the latch will readily enter the first notch 94. In case the centrifugal weights 29 fail to establish the minimum communication between the carbureter and the engine cylinder or cylinders when the lever 92 is moved to its low speed position, such minimum communication can be effected by moving the lever 92 from its low speed position counter-clockwise, Fig. 2, against the stop 96, thereby moving the pin 75 rearwardly from its low speed position in the slot 74 to a position behind the line through the axis of the shaft 71 and the end 77 of the arm 78, whereby the spring 76 rocks the shaft 71 clockwise, Figs. 1 and 4, which shaft, in turn, causes the levers 69 to move the shaft 53 forwardly through the medium of links 66 and lever 60, with the result of causing the link 62 to move the operating lever 64 of the throttle-valve to the position to establish the minimum communication between the carbureter and the engine cylinder or cylinders. Release of the lever 92 permits the spring 97 to restore the former to the low speed position.

It should be understood that, instead of the shaft 14 being driven from the engine shaft 22 through the medium of the pulleys 19 and 21 and belt 20 as hereinabove described, gearing, chain-and-sprocket driving mechanism, or any other suitable power transmitter (not shown) may be employed to drive the shaft 14 from the engine shaft 22.

In the alternate form of the invention depicted in Figs. 8 to 10, inclusive, the spring 76, levers 69, and links 66 are omitted entirely, and the following mechanism is provided in lieu thereof. The ends of the lever 60 have the forward ends of a pair of springs 98 attached thereto, and the rear ends of said springs are attached to and between the prongs 99 of the bifurcated ends of a pair of levers 100 by means of pins 101 or the like, said levers being rigidly mounted on the shaft 71. Another lever 102 rigidly mounted on the shaft 71 has the forward end of a link 103 pivotally connected thereto by a pin 104 or other suitable means, the rear end of said link being pivotally connected to the forward end of the link 79 by means of a pin 105 or the like. By this arrangement, movement of the lever 92 rocks the shaft 71 through the intermediary of shaft 90, pinion 89, gear 88, shaft 84, arm 83, links 79 and 103, and lever 101 and thereby regulates the tension of the springs 98 to increase or decrease the rearward pull of said springs upon the shaft 53, thereby increasing or decreasing the rearward pressure of the rod 28 for the purpose of adjusting the position of the operating lever 64 of the throttle-valve to control the speed of the car in the manner hereinabove described.

In order to facilitate the rocking of the shaft 71 to adjust the tension of the springs 98, a bell-crank 106 is pivoted at 107 to an extension 108 of the bracket 86, the arm 109 of said bell-crank being provided with a slot 110 to receive a pin 111 borne by a member 112, which is secured to the link 103, and the other arm 113 of said bell-crank being, also, provided with a slot 114, which has a pin 115 reciprocatively mounted therein and is preferably arcuated as shown in Fig. 8. A spring 116, which is attached at one end thereof to the pin 115 and at the other end to a bracket 117 secured to the dash-board 87 or other part of the automobile, tends to rotate the bell-crank 106 clockwise, Fig. 8, and thereby causes the arm 109 to pull rearwardly upon the pin 111 sufficiently to balance or nearly balance the pull of the springs 98. A rod 118 pivotally attached at one end to the pin 115 and at the other end to the link 103 moves with the latter and thereby moves the pin 115 in the slot 114. By this arrangement, whenever the lever 92 is moved from its low speed position to a position to permit the engine to drive the car at a higher speed, the arm 83 pulls the link 103 rearwardly through the medium of link 79, whereby said link 103 not only rocks the shaft 71 counter-clockwise to increase the tension of the springs 98, but, also, causes the rod 118 to move the pin 115 farther away from the pivot 107, with the result of increasing the pull of the arm 109 upon the pin 111 sufficiently to balance or nearly balance the pull of the springs 98. In this way, the spring 116 facilitates the moving of the lever 92.

In Figs. 11 to 15, inclusive, three alternate forms of the means for regulating the rearward pressure of the shaft 53 are depicted. In Fig. 11, a spring 119, which is coiled about a portion of the shaft 71, has one end attached to the lever 102 and the other end attached to one of the levers 100 and tends to rock the shaft 71 in the direction to cause the links 66 to pull the shaft 53 rearwardly, the lever 102, in this arrangement, being revolubly mounted on the shaft 71 and being connected to the link 103, so that same can be adjusted from the driver's seat, in the manner hereinabove described, to increase or decrease the pull of the spring 119 for various speeds of the car. In the form depicted on Fig. 12, the lever 60 is omitted entirely and the link 62 is connected to the plug 55 by a pin 120. The shaft 53 is relatively longer and has a member 121 reciprocatively mounted on the forward part of same, a spring 122 being interposed between said member and a collar or shoulder 123 on shaft 53. The forward ends of the links 66 are pivotally connected to the ends 124 of the member 121, and the lever 102 is rigidly mounted on the shaft 71, so that movement of the link 103 will cause the lever 102 to rock the shaft 71, which, in turn, effects movement of the member 121 through the medium of levers 100 and links 66, with the result of adjusting the rearward pressure of the spring 122 upon the collar or shoulder 123 on the shaft 52 to control the speed of the car as hereinabove described. In the form depicted in Figs. 13, 14, and 15, the link 103 is connected at one end of the lever 125, which may be pivotally attached at 126 to the engine or any other suitable part of the automobile. A spring 127 is attached to the other end of the lever 125 and, also, to an end of a lever 128, which is pivoted at 129 to an arm or projection 130 of the base 1. The other end of the lever 128 is bifurcated, its prongs 131 straddling the forward part of the shaft 53 and being pivotally connected at 132 to the rear ends, respectively, of the links 66, and the forward ends of said links being pivoted to the ends 67 of the lever 60. One of the prongs 131 is relatively longer than the other prong and has the link 62 pivoted at 133 to its end. By this arrangement, the pull of the spring 127 tends to rock the lever 128 counter-clockwise, Fig. 13, and thereby causes the links 66 to pull the shaft 53 and link 62 rearwardly. Movement of the link 103 in the manner hereinabove described effects adjustment of the spring 127 for the various speeds of the car. It will be observed that, by reason of the link 62 being farther away from the pivot 129 than the links 66, movement of the shaft 53 effects a relatively greater movement of the link 62.

One great advantage arising from the use of the governor hereinabove described is that the necessity and expense of using differential gearing to control the various speeds of the car are obviated. The operation of the governor will be readily understood from the foregoing, and needs no further description.

Various changes in the construction and arrangement of part may be made without departing from the nature and scope of the present invention.

I claim:

1. The combination with an automobile engine or the like, of a governor therefor including a fly-weight member driven from the engine shaft, a reciprocatory member associated with the weights and having a connection with the throttle-valve, and means for retarding the movement of said reciprocatory member comprising a rock-shaft, levers borne by said rock-shaft and having a connection with said reciprocatory member, a spring having a connection with one of said levers, and means for adjusting said spring from the driver's seat to enable movement of said lever and thereby the rock shaft clockwise or counter clockwise.

2. The combination with an automobile engine or the like, of a governor therefor including a fly-weight member driven from the engine shaft, a reciprocatory member associated with the weights and having a connection with the throttle-valve, and means for retarding the movement of said reciprocatory member comprising a rock-shaft, levers borne by said rock-shaft and having a connection with said reciprocatory member, there being a slot in one of said levers, an antifriction member adjustably supported in the slot in the slotted lever, and a spring connected with said antifriction member, the slot in the slotted lever being arranged to extend across said rock-shaft so that, when said antifriction member stands on one side of said rockshaft, said spring will retard the movement of said reciprocatory member, and, when said antifriction member stands on the other side of said rock-shaft, said spring will effect the positive movement of said reciprocatory member.

3. The combination with an automobile engine or the like, of a governor therefor including a fly-weight member driven from the engine shaft, a reciprotatory member associated with the weights and having a connection with the throttle-valve, and means for retarding the movement of said reciprocatory member comprising a rock-shaft, levers borne by said rock-shaft and having a connection with said reciprocatory member, one of said levers having a slot, which extends across said rock-shaft, an antifriction member adjustably supported in the slot in the slotted lever, a spring connected with said antifriction member, means for adjusting the position of said antifriction member from the driver's seat, and means normally limiting the movement of said adjusting means to retain said antifriction member on one side of said rock-shaft, thereby to permit said spring to retard the movement of said reciprocatory member, and being yieldable to permit said adjusting means to move said antifriction member to the other side of said rock-shaft, thereby to permit said spring to effect the positive movement of said reciprocatory member.

4. The combination with an automobile engine or the like, of a governor therefor including a fly-weight member driven from the engine shaft, a reciprocatory member associated with the weights and having a connection with the throttle-valve, and means for retarding the movement of said reciprocatory member comprising a spring having a connection with said reciprocatory member and means whereby the spring may be set so as to tension said member to move same in a forward or rearward direction.

5. The combination with an automobile engine or the like, of a governor therefor including a fly-weight member driven from the engine shaft, a reciprocatory member associated with the weights and having a connection with the throttle-valve, and means for retarding the movement of said reciprocatory member comprising an adjustable spring having a connection with said reciprocatory member, and a counterbalance for said spring adapted to facilitate the adjustment of same.

6. The combination with an automobile engine or the like, of a governor therefor including a fly-weight member driven from the engine shaft, a reciprocatory member associated with the weights and having a connection with the throttle-valve, and means for retarding the movement of said reciprocatory member comprising a plurality of adjustable springs having a connection with said reciprocatory member, and a counterbalance for said springs adapted to facilitate the adjustment of said springs.

7. The combination with an automobile engine or the like, of a governor therefor including a fly-weight member driven from the engine shaft, a reciprocatory member associated with the weights and having a connection with the throttle-valve, and means for retarding the movement of said reciprocatory member comprising an adjustable resilient means having a connection with said reciprocatory member, and an adjustable counterbalance for said resilient means adapted to facilitate the adjustment of same.

8. The combination with an automobile engine or the like, of a governor therefor including a fly-weight member driven from the engine shaft, a reciprocatory member associated with the weights and having a connection with the throttle-valve, resilient means for retarding the movement of said reciprocatory member, means for adjusting said resilient means from the driver's seat, and means adapted to facilitate the actuation of said adjusting means comprising a pivoted member having a connection with said adjusting means, a spring having an adjustable connection with said pivoted member, and means connecting the adjustable connection of said spring with said adjusting means.

9. The combination with an automobile engine or the like, of a governor therefor including a fly-weight member driven from the engine shaft, a reciprocatory member associated with the weights and having a connection with the throttle-valve, resilient means for retarding the movement of said reciprocatory member, means for adjusting said resilient means from the driver's seat, and means adapted to facilitate the actuation of said adjusting means comprising a support, a bell-crank pivoted to said support, one arm of said bell-crank having a sliding connection with said adjusting means, a spring having an adjustable connection with the other arm of said bell-crank, and means connecting the adjustable connection of said spring with said adjusting means.

10. The combination with an automobile engine or the like, of a governor therefor including a fly-weight member driven from the engine shaft, a reciprocatory member associated with the weights and having a connection with the throttle-valve, and means for retarding the movement of said reciprocatory member comprising a rock-shaft, levers borne by said rock-shaft and spaced from the reciprocatory member, and springs which act as a connection between said levers and said reciprocatory member.

11. The combination with an automobile engine or the like, of a governor therefor including a fly-weight member driven from the engine shaft, a reciprocatory member associated with the weights and having a connection with the throttle-valve, and means for retarding the movement of said reciprocatory member comprising a rock-shaft, levers borne by said rock-shaft, springs connected with said levers and having a connection with said reciprocatory member, and means for adjusting said rock-shaft to adjust said springs.

12. The combination with an automobile engine or the like, of a governor therefor including a fly-weight member driven from the engine shaft, a reciprocatory member associated with the weights and having a connection with the throttle-valve, and means for retarding the movement of said reciprocatory member comprising a rock-shaft, levers borne by said rock-shaft and having a connection with said reciprocatory member, an arm revolubly mounted on said rock-shaft, and a spring having a connection with said arm and one of said levers.

13. The combination with an automobile engine or the like, of a governor therefor including a fly-weight member driven from the engine shaft, a reciprocatory member associated with the weights and having a connection with the throttle-valve, and means for retarding the movement of said reciprocatory member comprising a rock-shaft, levers borne by said rock-shaft and having a connection with said reciprocatory member, an arm revolubly mounted on said rock-shaft, a spring having a connection with said arm and one of said levers, and means for adjusting the position of said arm to adjust said spring.

14. The combination with an automobile engine or the like, of a governor therefor including a fly-weight member driven from the engine shaft, a reciprocatory member associated with the weights and having a connection with the throttle-valve, and means for retarding the movement of said reciprocatory member comprising a member slidably mounted on said reciprocatory member, a spring intermediate said slidable member and a part of said reciprocatory member, and means for adjusting said slidable member to adjust said spring.

15. The combination with an automobile engine or the like, of a governor therefor including a fly-weight member driven from the engine shaft, a reciprocatory member associated with the weights and having a connection with the throttle-valve, and means for retarding the movement of said reciprocatory member comprising a member slidably mounted on said reciprocatory member, a shoulder borne by said reciprocatory member, a spring intermediate said slidable member and said shoulder, and means for adjusting said slidable member to adjust said spring.

16. The combination with an automobile engine or the like, of a governor therefor including a fly-weight member driven from the engine shaft, a reciprocatory member associated with the weights, a pivoted member in connection with the throttle-valve, and said reciprocatory member, and a spring connected with said pivoted member adapted to retard the movement of said reciprocatory member.

17. The combination with an automobile engine or the like, of a governor therefor including a fly-weight member driven from the engine shaft, a reciprocatory member associated with the weights, a pivoted member in connection with the throttle-valve and with said reciprocatory member, a spring connected with said pivoted member adapted to retard the movement of said reciprocatory member, and means for adjusting said spring from the driver's seat.

18. The combination with an automobile engine or the like, of a governor therefor including a fly-weight member driven from the engine shaft, a reciprocatory member associated with the weights, a pivoted member in connection with the throttle-valve and said reciprocatory member, and an adjustable spring connected with said pivoted member adapted to retard the movement of said reciprocatory member in one position, and in another position to effect movement of said reciprocatory member.

19. In combination with an automobile engine, a governor actuated thereby and including an endwise movable element, a sliding member alined with said governor element and actuated by engagement with one end of said element and having connection with the throttle valve.

20. In combination with an automobile engine, a governor actuated thereby, slidable means having one end loosely abutting the governor and having connection with the throttle valve to operate the latter, and means to adjust the slidable means so that same may be moved toward or away from the governor.

21. In combination with an automobile engine, a governor actuated thereby, slidable means having one end loosely abutting the governor and having connection with the throttle valve to actuate the latter and spring means connected to the slidable means to vary the pressure the latter exerts against the governor.

22. In combination with an automobile engine, and a governor actuated thereby, means operated by the governor to control the throttle valve, and means to move the first named means in engagement with the governor in one position so as to retard movement of the same, and in another position to move the first named means to effect positive movement.

23. In combination with an automobile engine, a fly-weight governor driven from the engine shaft, reciprocatory means operated by the governor movements to regulate the throttle valve, and means whereby said reciprocatory means may be caused to move forward or rearward with relation to the governor.

24. In combination with an automobile engine, a governor driven from the engine, means actuated by the governor movements to regulate the throttle valve, and means to vary the direction of movement of the first named means to thereby enable corresponding control of the throttle valve.

25. In combination with an automobile engine, a governor actuated by the engine, means connected to the throttle valve and actuated by the governor to control the throttle valve, spring means connected to the first named means to tension the latter, and means to allow the spring means to be adjusted so as to move the first named means rearward or forward.

26. In combination with an automobile engine and a governor actuated thereby, means in connection with the governor and with the throttle valve to actuate the latter, and means adjustable so as to retard the movement of the first named means in one position and in another position to effect positive movement of the first named means.

In testimony whereof I hereunto affix my signature in the presence of two witnesses.

MYRON T. BAIRD.

Witnesses:
GEORGE G. ANDERSON,
WALTER C. GUELS.